(12) United States Patent
Michael

(10) Patent No.: US 7,357,888 B2
(45) Date of Patent: Apr. 15, 2008

(54) METHOD OF PRODUCING HEADLINERS, DOOR PANELS AND INTERIOR TRIM PARTS

(75) Inventor: Rajendran S. Michael, Milford, MI (US)

(73) Assignee: Owens Corning Intellectual Capital, LLCDE (US)

( * ) Notice: Subject to any disclaimer, the term of this patent is extended or adjusted under 35 U.S.C. 154(b) by 345 days.

(21) Appl. No.: 10/328,965

(22) Filed: Dec. 24, 2002

(65) Prior Publication Data

US 2003/0121989 A1 Jul. 3, 2003

Related U.S. Application Data

(60) Provisional application No. 60/345,694, filed on Dec. 31, 2001.

(51) Int. Cl.
*D21B 1/04* (2006.01)

(52) U.S. Cl. ............... 264/115; 264/45.3; 264/109; 264/121; 264/152; 264/241; 264/517; 239/8

(58) Field of Classification Search ......... 264/109–128
See application file for complete search history.

(56) References Cited

U.S. PATENT DOCUMENTS

| | | | | |
|---|---|---|---|---|
| 2,094,868 A | * | 10/1937 | Baxter | ............... 524/9 |
| 2,702,261 A | * | 2/1955 | Bacon et al. | ............... 428/359 |
| 2,992,154 A | * | 7/1961 | Anna et al. | ............... 162/9 |
| 3,091,404 A | * | 5/1963 | Winn, Jr. | ............... 239/416.1 |
| 3,117,055 A | | 1/1964 | Guandique et al. | |
| 3,249,307 A | * | 5/1966 | McNinch, Jr. | ............... 239/336 |
| 3,639,424 A | * | 2/1972 | Gray et al. | ............... 525/177 |
| 3,981,654 A | | 9/1976 | Rood et al. | |
| 5,229,052 A | | 7/1993 | Billiu | |
| 5,338,169 A | | 8/1994 | Buckley | |
| 5,766,541 A | * | 6/1998 | Knutsson et al. | ............... 264/571 |
| 5,806,387 A | | 9/1998 | Jander | |
| 5,819,614 A | | 10/1998 | Jander | |
| 5,976,453 A | * | 11/1999 | Nilsson et al. | ............... 264/555 |
| 6,029,897 A | * | 2/2000 | Jander | ............... 239/8 |
| 6,038,949 A | | 3/2000 | Jander | |
| 6,207,729 B1 | * | 3/2001 | Medoff et al. | ............... 53/129 |
| 6,715,191 B2 | * | 4/2004 | Adzima et al. | ............... 28/247 |

FOREIGN PATENT DOCUMENTS

| | | |
|---|---|---|
| EP | 692 616 | 1/1996 |
| GB | 2 158 001 | 11/1985 |

* cited by examiner

*Primary Examiner*—Christina Johnson
*Assistant Examiner*—Jeff Wollschlager
(74) *Attorney, Agent, or Firm*—Inger H. Eckert; Margaret S. Millikin

(57) ABSTRACT

A method of making an article includes the steps of feeding fiber yarn, bundle or roving into a chopping device, chopping the fiber yarn, bundle or roving into fiber segments, texturizing the fiber segments, simultaneously introducing the fiber segments and a binder into a mold and molding the article.

6 Claims, 2 Drawing Sheets

METHOD OF PRODUCING HEADLINERS, DOOR PANELS AND INTERIOR TRIM PARTS

TECHNICAL FIELD AND INDUSTRIAL APPLICABILITY OF THE INVENTION

The present invention relates to methods for producing articles from fiber materials and more particularly to the manufacture of articles from chopped fiber yarn, bundle or roving and a resinous binder.

BACKGROUND OF THE INVENTION

Structural composites and other reinforced molded articles are commonly made by resin transfer molding and structural resin injection molding. These molding processes have been made more efficient by preforming the reinforcement fibers into a reinforcement layer or mat, which is the approximate size and shape of the molded article, prior to inserting the reinforcements into the mold. To be acceptable for production at an industrial level, a fast preforming process is required. In the manufacture of preforms, a common practice is to supply a continuous length of reinforcement strand or fiber to a chopper, which chops the continuous fiber into many discrete length fibers and deposits the discrete length fibers onto a collection surface. This process can be used to make preforms in an automated manner by mounting the reinforcement dispenser for movement over the collection surface and programming the movement of the dispenser to apply the reinforcement fibers in a predetermined, desired pattern. The reinforcement dispenser can be robotized or automated and such reinforcement fiber dispensers are known art for such uses as making preforms for large structural parts such as headliners, door panels and interior trim parts for the automotive industry.

Over the years the technical requirements for reinforcement products have increased and new methods have been developed for dispensing and laying down reinforcement fibers. Two of the more recently developed and effective methods are disclosed in U.S. Pat. Nos. 5,806,387 and 6,029,897 to Jander. In the Jander '387 patent a method for dispensing reinforcement fibers for the making of a preform or laminate includes winding a continuous length of a reinforcement fiber into coils around a form having a longitudinal axis. This is followed by the moving of the coils axially with respect to the form to engage a cutter. Next is the cutting of the coils to form discrete length reinforcement fibers. This is followed by the applying of a resinous material to the discrete fibers and the dispensing of the discrete length reinforcement fibers upon a molding surface.

In the Jander '897 patent the method for dispensing a reinforcement strand includes chopping the reinforcement strand into discrete reinforcement fibers and directing the reinforcement fibers into a dispensing nozzle so that the fibers travel along a path extending generally along a longitudinal axis of the nozzle. Next is the introducing of a fluid into the nozzle in a circumferential direction with respect to the longitudinal axis thereby creating a vortex of the fluid surrounding the fibers in the nozzle. This is followed by the dispensing of the reinforcement fibers onto a mold surface from the nozzle as a flow. That flow of fibers is controlled by controlling the fluid introduced into the nozzle.

While the devices disclosed in the Jander '387 and '897 patents have significantly improved the ability of the manufacturer to vary the delivery and particularly the width of the flow of chopped fibers dispensed by the fiber dispenser at the high speeds necessary for commercially successful operations, further advances in technology are still desired in order to increase the speed of the manufacturing process. The present invention meets this goal while also reducing production costs, eliminating the need for a mat made product and allowing greater input flexibility with respect to the use of a wide variety of natural and synthetic fiber materials.

SUMMARY OF THE INVENTION

In accordance with the purposes of the present invention as described herein, an improved method is provided for making an article from chopped fiber yarn, bundle or roving in a resin binder. That method includes the steps of feeding a fiber yarn, bundle or roving into a chopping device and chopping that fiber yarn, bundle or roving into fiber segments. This is followed by the texturizing of the fiber segments. Next is the simultaneous introducing of the fiber segments and a binder into a mold. This is followed by the molding of the article.

The fiber yarn, bundle or roving may be selected from a group consisting of natural fibers, synthetic fibers and mixtures thereof. Natural fibers useful in the present invention include, for example, kenaf, jute, sisal, hemp and mixtures thereof. Synthetic fibers useful in the present invention include but are not limited to polyester, glass, carbon, polyolefin, other polymers commonly used for such industrial applications, copolymers and blends and any mixtures thereof. Specific synthetic fibers typically utilized in the present method include A glass, C glass, E glass, polypropylene, polyethylene terephthalate, polybutylene terephthalate and mixtures thereof.

More specifically describing the invention, the feeding of the fiber yarn, bundle or roving into the chopping device typically occurs at a rate of about 2 to about 50 meters/minute. The fiber yarn, bundle or roving is then chopped into fiber segments that are typically about 0.1 to about 10 inches in length and more commonly 0.5 to about 5 inches in length.

During texturizing the chopped fiber segments are passed through a texturizing gun at a rate of about 1 to about 15 meters/minute while simultaneously injecting a pressurized fluid at a pressure of about 0.1 to about 7 bar and more typically about 1.0 to about 2.0 bar.

The resinous binder utilized in the present method may be either a thermoset or a thermoplastic resin. The binder may be selected from a group consisting of solid resin powders, solid resin fibers, liquid resin, foamable resin and mixtures thereof. Resin binders typically utilized in the present method may be selected from a group of resinous materials consisting of acrylic, urethane, epoxy, vinyl acetate, epoxy-acrylic hybrids and any mixtures thereof.

The method may be further characterized by the introduction into the mold of fiber segments at a weight percentage of about 35% to about 85% and resinous binder at a weight percentage of about 15% to about 65%. In addition, the method includes the step of selecting a particular type of fiber yarn, bundle or roving from a supply of different types of fiber yarns, bundles or rovings for feeding into the chopping device. This allows one to rapidly select between available starting materials suitable for use in the production of particular articles.

In the following description there is shown and described a preferred embodiment of the present invention, simply by way of illustration of one of the modes best suited to carry out the invention. As it will be realized, the invention is capable of other different embodiments and its several details are capable of modification in various, obvious aspects all without departing from the invention. Accordingly, the drawing and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Figure 1:
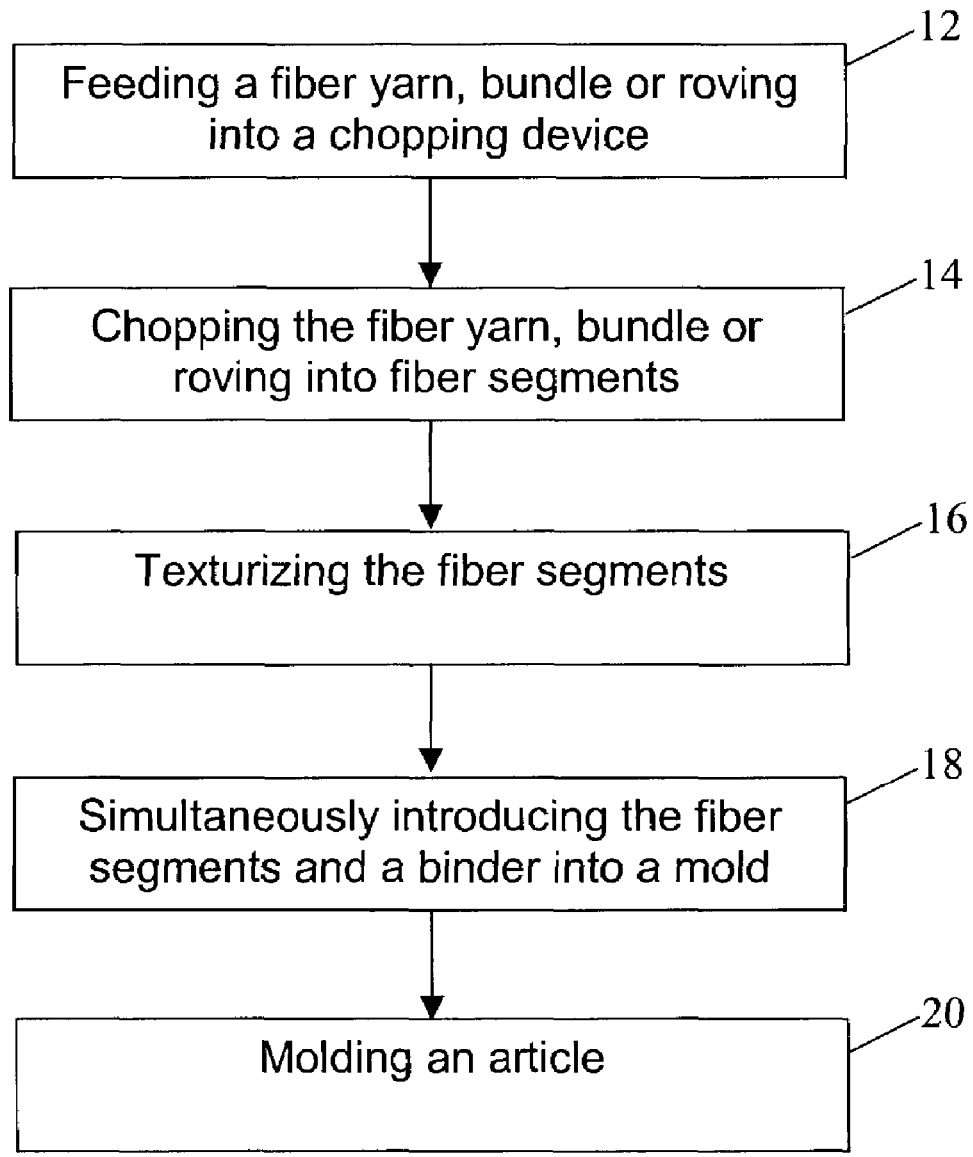
FIG. 1 is a schematic block diagram of the present method.

Reference will now be made in detail to the present preferred embodiment of the invention, an example of which is illustrated in the accompanying drawing.

DETAILED DESCRIPTION OF THE INVENTION

Reference is now made to the drawing figures schematically illustrating the method of the present invention for making an article from natural or synthetic fiber and a resinous binder. The method 10 includes feeding a fiber yarn, bundle or roving 30 into a chopping device 32 (note feeding step 12). Specifically, a strand feeder of a type known in the art comprising one or more strand feeding mechanisms feeds at least one continuous reinforcing fiber strand from a spool source 34 to the chopping device 32. The reinforcing fiber may be a continuous strand of natural fiber selected from a group consisting of, for example, kenaf, jute, sisal, hemp and mixtures thereof. The use of natural fibers allows for the production of an environmentally friendly product that is more readily recyclable. It should also be appreciated, however, that the continuous fiber strand may be a synthetic fiber such as, for example, polyester, glass, carbon, polyolefin, and any polymer known to be useful for the particular end product article, copolymers and blends and mixtures thereof. Specific synthetic fibers that have been found to be useful in the present invention include but are not limited to A glass, C glass, E glass, polypropylene, polyethylene terephthalate, polybutylene terephthalate and mixtures thereof.

It should be appreciated that the strand feeder can feed a wide variety of natural and/or synthesis fibers so that one can quickly switch the method from one type of fiber to another thereby allowing a manufacturer to utilize several different supply streams of materials depending upon the end product being produced or even material availability.

The chopping device 32 utilized in the present invention may be of any type known in the art and useful for this particular application including but not limited to the devices disclosed in the Jander '387 and '897 patents. The continuous fiber strand is fed into the chopping device at a rate of about 2 to about 50 meters/minute so as to allow a commercially acceptable speed of production. The step 14 of chopping the fiber yarn, bundle or roving into fiber segments takes place in the chopping device. Specifically, the resulting fiber segments are about 0.1 inch to about 10.0 inches and more commonly 0.5 inch to about 5.0 inches in length.

This is followed by the step 16 of texturizing the fiber segments. Specifically, the fiber segments are passed through a texturizing gun 36 at a rate of about 1 to about 15 meters/minute while simultaneously injecting a pressurized fluid such as air from a pressurized air source 38 into the texturizing gun 36 at a pressure of about 0.1-7.0 bar and more typically about 1.0-2.0 bar. As the fiber segments pass through the texturizing gun 36 the fiber segments 40 are expanded and fluffed into a wool-like product. The texturized fiber segments have an overall density of from about 50 grams/liter to about 500 grams/liter.

Figure 2:
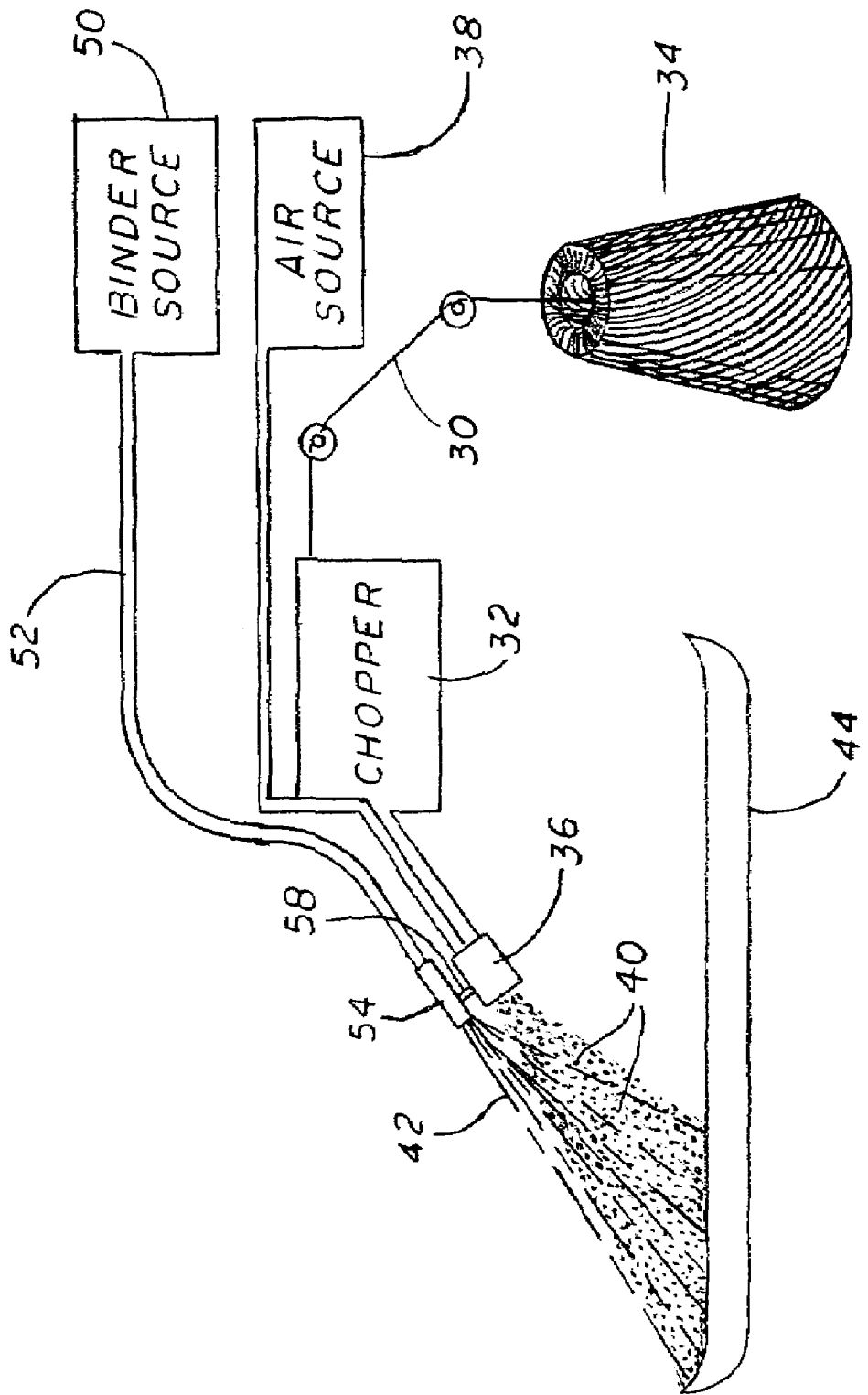
FIG. 2 is a schematic illustration of the feeding, chopping, texturizing and introducing steps.

Next is the step 18 of simultaneously introducing the texturized fiber segments and a resinous binder into a mold. More specifically, the binder is fed from a source 50 through a conduit 52 to a nozzle 54. As illustrated, the nozzle 54 is connected to the texturizing gun 36 by a bracket 58. Both the chopped fiber segments 40 and resinous binder 42 may be delivered directly into a cavity of, for example, a fabric, vinyl or leather door skin 44 as illustrated in FIG. 2 and then placed in a mold, or directly into a mold for heat and/or pressure molding into a desired article shape. Articles which may be manufactured by the present invention include but certairdy are not limited to headliners, door panel liners or interior trim parts. The final product should have a density range of fibers of between about 100-1000 grams/square meter at a thickness ranging from about 2 mm to about 15 mm. The thickness of the resulting product is easily controlled. The thicker regions provide structural rigidity and absorb sound and impact energy while the thinner regions may, for example, act as a speaker panel which may be excited by NXT technology as described in U.S. Pat. No. 6,324,294 to Adzima et al.

The resinous binder utilized in the present method may be a thermoset or a thermoplastic resin. The resinous binder may be a solid resin powder, a solid resin fiber, liquid resin, foamable resin or any mixture thereof. Appropriate resinous binders useful in the present invention include but are not limited to acrylic, urethane, epoxy, vinyl acetate, epoxy-acrylic hybrids and any mixtures thereof. The chopped fiber segments are introduced into the mold at a weight percentage of about 35-85% while the resinous binder is introduced into the mold at a weight percentage of about 15-65%. Generally, this weight percentage fiber range produces a lower cost product and shortens production process cycle times while still providing the desired performance characteristics. For example, desirable performance characteristics for headliners and other vehicle trim panels include good acoustical and/or thermal insulating properties.

The following examples are provided to further illustrate the invention but the invention is not to be considered as limited thereto.

EXAMPLE 1

A door panel is produced in accordance with the present method from 70% natural fibers (jute) texturized with 30% urethane resin. The door panel meets the current industry flex modulus and tensile strength specifications for trim panels.

EXAMPLE 2

An interior trim panel is produced in accordance with the present method from 70% natural fibers (50% flax and 50% hemp) with 30% binder powder (acrylic-epoxy).

EXAMPLE 3

An interior trim panel is produced by the present method as described above from 70% natural fiber (50% hemp and 50% kenaf) with 30% urethane resin. The panel provides a flex modulus between 40 Kpsi and 60 Kpsi and a tensile strength at yield between 500 psi and 1500 psi.

The foregoing description of the preferred embodiment of the invention has been presented for purposes of illustration and description. It is not intended to be exhaustive or to limit the invention to the precise form disclosed. Obvious modifications or variations are possible in light of the above teachings.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The invention claimed is:

1. A method of making an automotive headliner, door panel or interior trim part, comprising:
    selecting a fiber yarn, bundle, or roving of natural fiber selected from a group consisting of kenaf, jute, sisal, hemp and mixtures thereof;
    feeding said fiber yarn, bundle, or roving into a chopping device;
    chopping said fiber yarn, bundle, or roving into fiber segments having a length of about 0.1 inch to about 10 inches;
    texturizing said fiber segments by passing said fiber segments through a texturizing gun at a rate of about 1 to about 15 meters/minute and injecting a fluid at a pressure of about 0.1 to about 7.0 bar;
    simultaneously introducing said fiber segments at a weight percentage of about 35 to about 85 percent and a binder at a weight percentage of about 15 to about 65 percent into a mold; and
    molding said fiber segments and binder into an automotive headliner, door panel or interior trim part.

2. The method of claim 1, wherein said binder is a thermoset resin.

3. The method of claim 1, wherein said binder is a thermoplastic resin.

4. The method of claim 1, further including selecting said binder from a group consisting of solid resin powders, solid resin fibers, liquid resin, foamable resin and mixtures thereof.

5. The method of claim 1, further including selecting said binder from a group of resinous materials consisting of acrylic, urethane, epoxy, vinyl acetate, epoxy-acrylic hybrids, and any mixtures thereof.

6. The method of claim 1, further including the step of selecting a particular type of fiber yarn, bundle or roving from a supply of different types of fiber yarns, bundles or rovings for feeding into the chopping device.

* * * * *